(12) United States Patent
Rice

(10) Patent No.: US 11,791,987 B2
(45) Date of Patent: *Oct. 17, 2023

(54) CONTENT VALIDATION USING BLOCKCHAIN

(71) Applicant: Capital One Services, LLC, McLean, VA (US)

(72) Inventor: Pamela Rice, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/451,003

(22) Filed: Oct. 15, 2021

(65) Prior Publication Data

US 2022/0038261 A1  Feb. 3, 2022

Related U.S. Application Data

(63) Continuation of application No. 16/598,102, filed on Oct. 10, 2019, now Pat. No. 11,153,073, which is a
(Continued)

(51) Int. Cl.
*H04L 29/06* (2006.01)
*H04L 9/06* (2006.01)
(Continued)

(52) U.S. Cl.
CPC ........ *H04L 9/0643* (2013.01); *G06F 16/1805* (2019.01); *G06F 21/10* (2013.01);
(Continued)

(58) Field of Classification Search
CPC .............. H04L 9/0643; H04L 9/3239; H04L 9/0637; H04L 9/30; G06F 21/645; G06F 21/10
(Continued)

(56) References Cited

U.S. PATENT DOCUMENTS 9,870,508 B1   1/2018   Hodgson et al.
10,121,025 B1   11/2018   Rice
(Continued)

FOREIGN PATENT DOCUMENTS

WO   2017145009 A1   8/2017

OTHER PUBLICATIONS

Dickson B., "How Blockchain Helps Fight Fake News and Filter Bubbles," Aug. 2017, 6 pages. Retrieved from Internet:[URL:https://thenextweb.com/contributors/2017/08/24/blockchain-helps-fight-fake-news-filter-bubbles/].
(Continued)

*Primary Examiner* — Longbit Chai
(74) *Attorney, Agent, or Firm* — Harrity & Harrity, LLP

(57) ABSTRACT

A device may receive content data from a content provider, the content data including: data identifying content, and data for verifying that the content has not changed. The device may access a blockchain associated with the content data, the blockchain including validation information specifying instructions for validating the content. In addition, the device may perform, based on the validation information, validation of the content to determine a measure of confidence that the content is accurate and store results of the validation in the blockchain as a transaction. Based on the validation results, the device may perform an action.

20 Claims, 7 Drawing Sheets

Related U.S. Application Data continuation of application No. 16/157,609, filed on Oct. 11, 2018, now Pat. No. 10,482,288, which is a continuation of application No. 15/902,368, filed on Feb. 22, 2018, now Pat. No. 10,121,025.

(51) Int. Cl.

| | | |
|---|---|---|
| *G06F 21/64* | (2013.01) | |
| *G06F 21/60* | (2013.01) | |
| *G06F 16/18* | (2019.01) | |
| *H04L 9/32* | (2006.01) | |
| *G06F 21/10* | (2013.01) | |
| *H04L 9/30* | (2006.01) | |
| *H04L 67/1042* | (2022.01) | |
| *H04L 9/00* | (2022.01) | |
| *G06F 16/182* | (2019.01) | |

(52) U.S. Cl.
CPC ............ *G06F 21/602* (2013.01); *G06F 21/64* (2013.01); *G06F 21/645* (2013.01); *H04L 9/0637* (2013.01); *H04L 9/30* (2013.01); *H04L 9/3239* (2013.01); *G06F 16/1834* (2019.01); *H04L 9/50* (2022.05); *H04L 67/1042* (2013.01); *H04L 2209/608* (2013.01)

(58) Field of Classification Search
USPC .......................................................... 713/150
See application file for complete search history.

(56) References Cited

U.S. PATENT DOCUMENTS

| | | | |
|---|---|---|---|
| 10,250,381 | B1 | 4/2019 | Rice |
| 10,482,288 | B2 | 11/2019 | Rice |
| 10,708,070 | B2* | 7/2020 | Fallah .................. H04L 9/3265 |
| 11,153,073 | B2 | 10/2021 | Rice |
| 2016/0283920 | A1 | 9/2016 | Fisher et al. |
| 2017/0134131 | A1 | 5/2017 | Sharma et al. |
| 2017/0134161 | A1 | 5/2017 | Goeringer et al. |
| 2017/0206523 | A1 | 7/2017 | Goeringer et al. |
| 2017/0286880 | A1 | 10/2017 | Wiig et al. |
| 2018/0018590 | A1* | 1/2018 | Szeto ..................... G06N 20/10 |
| 2018/0041571 | A1* | 2/2018 | Rogers ................ G06F 16/2379 |

OTHER PUBLICATIONS

Greene T., "Using Blockchain to Fight Fake News is the Most 2017 Thing Ever," Oct. 2017, 7 pages. Retrieved from Internet:[URL:https://thenextweb.com/cryptocurrency/2017/10/23/an-ico-for-blockchain-technology-that-disrupts-fake-news-is-the-most-2017-thing-ever/].

International Search Report and Written Opinion for Application No. PCT/US2019/018745, dated May 13, 2019, 10 pages.

Kapkowski G., "Userfeeds Platform: Data Overview," Sep. 13, 2017, 7 pages. Retrieved from Internet:[URL https://blog.userfeeds.io/userfeeds-platform-data-overview-79c57c72720f].

Martidis, "How Blockchain and AI Can Defeat Fake News," May 15, 2017, 200 pages. Retrieved from Internet:[URL:https://dzone.com/articles/blockchain-and-ai-can-defeat-fake-news].

Mez., "Forget Bitcoin, The Blockchain could Reveal What's True Today and Tomorrow," Mar. 22, 2017, 24 pages. Retrieved from Internet:[URL:https://www.wired.com/2017/03/forget-bitcoin-blockchain-reveal-whats-true-today-tomorrow/].

Userfeeds, "Algorithms," 2017, 9 pages. Retrieved from Internet:[URL:https://userfeeds-platform.readthedocshosted.com/en/latest/ref/algorithms.html].

Userfeeds, "An Open Protocol for Establishing Information Relevance in Crypto-economic Networks," 2016, 8 pages. Retrieved from Internet:[URL:https://blog.userfeeds.io/].

\* cited by examiner

600

News Article Title

Lorem ipsum dolor sit amet, consectetur adipiscing elit. Pellentesque pretium molestie arcu, ut vulputate mauris laoreet non. Quisque pulvinar diam a dolor ullamcorper maximus. Integer imperdiet pretium nisi, eget tempor lectus fringilla eu. Sed ultricies gravida odio, et blandit ante tristique in. Vivamus dignissim ac magna eget finibus. Maecenas sit amet tortor mauris. Curabitur molestie odio ut rutrum placerat. Cras a commodo augue. Aliquam maximus volutpat mi, vel sollicitudin arcu dapibus at. Aliquam fringilla sodales vehicula, Aliquam semper semper nisl, in dignissim sem ullamcorper id. Interdum et malesuada fames ac ante ipsum primis in faucibus. Nunc aliquet volutpat nibh, sed dictum eros tincidunt at. Lorem ipsum dolor sit amet, consectetur adipiscing elit.

Validated by content validator, click here to learn more

News Article Title

Lorem ipsum dolor sit amet, consectetur adipiscing elit. Pellentesque pretium molestie arcu, ut vulputate mauris laoreet non. Quisque pulvinar diam a dolor ullamcorper maximus. Integer imperdiet pretium nisi, eget tempor lectus fringilla eu. Sed ultricies gravida odio, et blandit ante tristique in. Vivamus dignissim ac magna eget finibus. Maecenas sit amet tortor mauris. Curabitur molestie odio ut rutrum placerat. Cras a commodo augue. Aliquam maximus volutpat mi, vel sollicitudin arcu dapibus at. Aliquam fringilla sodales vehicula, Aliquam semper semper nisl, in dignissim sem ullamcorper id. Interdum et malesuada fames ac ante ipsum primis in faucibus. Nunc aliquet volutpat nibh, sed dictum eros tincidunt at. Lorem ipsum dolor sit amet, consectetur adipiscing elit.

Content may contain inaccuracies, please click here to learn more

News Article Title

Lorem ipsum dolor sit amet, consectetur adipiscing elit. Pellentesque pretium molestie arcu, ut vulputate mauris laoreet non. Quisque pulvinar diam a dolor ullamcorper maximus. Integer imperdiet pretium nisi, eget tempor lectus fringilla eu. Sed ultricies gravida odio, et blandit ante tristique in. Vivamus dignissim ac magna eget finibus. Maecenas sit amet tortor mauris. Curabitur molestie odio ut rutrum placerat. Cras a commodo augue. Aliquam maximus volutpat mi, vel sollicitudin arcu dapibus at. Aliquam fringilla sodales vehicula, Aliquam semper semper nisl, in dignissim sem ullamcorper id. Interdum et malesuada fames ac ante ipsum primis in faucibus. Nunc aliquet volutpat nibh, sed dictum eros tincidunt at. Lorem ipsum dolor sit amet, consectetur adipiscing elit.

Content validated by content validator. Please click here to learn more

News Aggregator

News Article A
Lorem ipsum dolor sit amet, consectetur adipiscing elit.
Validated News Article B
Lorem ipsum dolor sit amet, consectetur adipiscing elit.
Validation in progress News Article C
Lorem ipsum dolor sit amet, consectetur adipiscing elit.
Not validated

FIG. 6D

CONTENT VALIDATION USING BLOCKCHAIN

CROSS-REFERENCE TO RELATED APPLICATIONS

This application is a continuation of U.S. patent application Ser. No. 16/598,102, filed Oct. 10, 2019 (now U.S. Pat. No. 11,153,073), which is a continuation of U.S. patent application Ser. No. 16/157,609, filed Oct. 11, 2018 (now U.S. Pat. No. 10,482,288), which is a continuation of U.S. patent application Ser. No. 15/902,368, filed Feb. 22, 2018 (now U.S. Pat. No. 10,121,025), which are incorporated herein by reference.

BACKGROUND

Content providers are entities that often provide a variety of content (e.g., web pages, news articles, scholarly articles, micro-blog posts, images, videos, software, and/or the like) in digital form for consumption by users. The content provided by content providers is often provided to, or otherwise made available to, users by distributing the content to users' computing devices that are part of a network, including private networks and public networks, such as the Internet. Generally, there are very few limits on the content that content providers make available to users, and it can often be difficult for users to verify the validity of the content that the users have been provided.

A blockchain is a continuously growing list of records, called blocks, which are linked and secured using cryptography. Each block may contain a hash pointer as a link to a previous block, a timestamp, and transactional data (e.g., each block may include many transactions). By design, a blockchain is inherently resistant to modification of the transactional data. A blockchain may be managed by a peer-to-peer network of nodes (e.g., devices) collectively adhering to a consensus protocol for validating new blocks. Once recorded, the transaction data in a given block cannot be altered retroactively without the alteration of all previous blocks, which requires collusion of a majority of the network nodes.

A blockchain is an append-only data structure maintained by a network of nodes that do not fully trust each other. A permissioned blockchain is a type of blockchain where access to the network of nodes is controlled in some manner, e.g., by a central authority and/or other nodes of the network. All nodes in a blockchain network agree on an ordered set of blocks, and each block may contain one or more transactions. Thus, a blockchain may be viewed as a log of ordered transactions. One particular type of blockchain (e.g., Bitcoin) stores coins as system states shared by all nodes of the network. Bitcoin-based nodes implement a simple replicated state machine model that moves coins from one node address to another node address, where each node may include many addresses. Furthermore, public blockchains may include full nodes, where a full node may include an entire transactional history (e.g., a log of transactions), and a node may not include the entire transactional history. For example, Bitcoin includes thousands of full nodes in all of the nodes that are connected to Bitcoin.

Another particular type of blockchain (e.g., Ethereum) extends Bitcoin to support user-defined and Turing-complete state machines. An Ethereum blockchain lets the user define complex computations and/or instructions in a form of a smart contract, which includes executable code designed to perform one or more actions based on the occurrence of a condition. An Ethereum smart contract, for example, defines, in executable code, a computer protocol that facilitates, verifies, and/or enforces negotiation or performance of a contract. Once deployed, a smart contract is executed on all Ethereum nodes as a replicated state machine. The Ethereum node includes an execution engine (e.g., an Ethereum virtual machine (EVM)) that executes a smart contract. One difference between Ethereum and Bitcoin is that smart contract and transaction states are maintained by Ethereum, while only transaction states are maintained by Bitcoin. In fact, a smart contract is identified by a unique address that includes a balance. Upon retrieving a trigger transaction to the unique address, the smart contract executes logistics of the smart contract.

SUMMARY

According to some implementations, a device may comprise: one or more memory devices; and one or more processors, communicatively connected to the one or more memory devices, to: receive content data from a content provider, the content data including: data identifying content, and data for verifying that the content has not changed; access a blockchain associated with the content data, the blockchain including: validation information specifying instructions for validating the content; perform, based on the validation information, a validation of the content to determine a measure of confidence that the content is accurate; store validation results of the validation in the blockchain, the validation results being stored in the blockchain as a transaction; and perform an action based on the validation results.

According to some implementations, a non-transitory computer-readable medium may store instructions, the instructions comprising: one or more instructions that, when executed by one or more processors, cause the one or more processors to: receive data identifying content associated with a content provider; receive hash data that is based on a hash of the content; access a blockchain associated with the content, the blockchain including: validation information specifying a process for validating the content; determine whether the content is accurate based on the validation information; store results of the determination in the blockchain, the results being stored in the blockchain as a transaction; and perform an action based on the results.

According to some implementations, a method may comprise: receiving, by a device associated with a blockchain network, content data associated with a content provider; accessing, by the device, a blockchain associated with the content data, the blockchain including: validation information specifying instructions for validating the content; performing, by the device and based on the validation information, a validation of the content to determine whether the content is accurate; storing, by the device, validation results of the validation in the blockchain, the validation results being stored in a transaction on the blockchain; and performing, by the device, an action based on the validation results.

BRIEF DESCRIPTION OF THE DRAWINGS

FIGS. 6A-6D are diagrams of example content validated using a blockchain.

DETAILED DESCRIPTION

Figure 1:
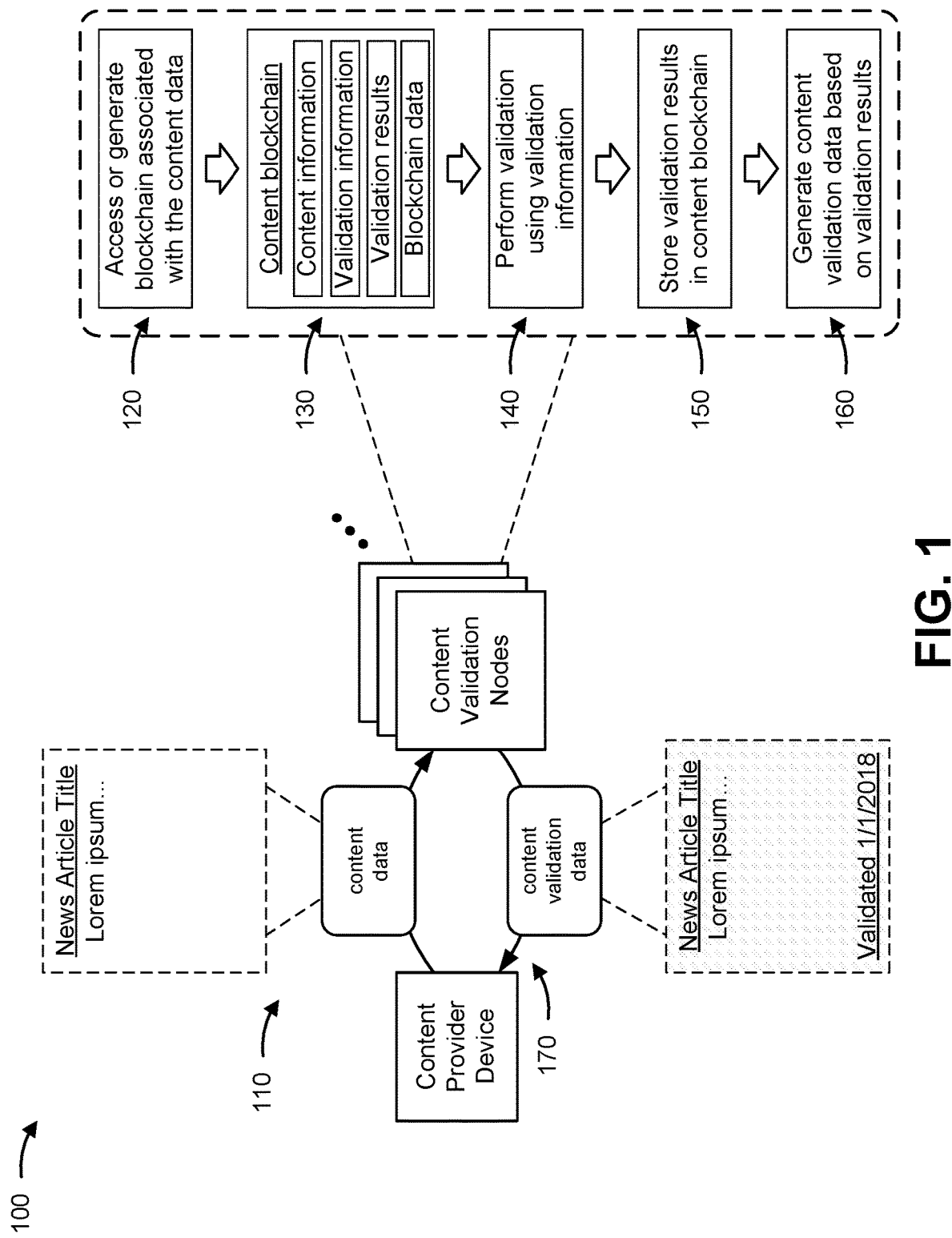
FIG. 1 is a diagram of an overview of an example implementation described herein.

The following detailed description of example implementations refers to the accompanying drawings. The same reference numbers in different drawings may identify the same or similar elements.

Users of user devices (e.g., home computers, laptop computers, smart phones, and/or the like) often encounter content (e.g., web pages, news articles, scholarly articles, micro-blog posts, social network content, images, videos, software, and/or the like), the accuracy of which may be difficult to verify. For example, a user may browse the Internet on a home computer and encounter a news article provided by a website of a news organization or other content provider. Without separate knowledge of the content included in the news article, or some other form of independent verification or validation, the user may not be aware of the trustworthiness, legitimacy, validity, accuracy, or lack thereof, of the news article. For a content provider, such as the news organization, providing content that lacks some form of verification may lead to inaccurate content publications and the inability to provide a consumer of the content (e.g., the user) with an indication that content is valid, which may negatively impact the credibility of the content provider and/or the perceived accuracy of the content.

Some implementations, described herein, may provide content validation using blockchain technology. For example, content providers may request content validation from a network of one or more content validation nodes (e.g., computing devices operating as nodes in a blockchain network) or from a validation wrapper device (e.g., a computing device designed to facilitate communications with the blockchain network). A content validation node may receive content data from a content provider, such as data identifying a network address of the content and other data indicative of the content, such as a hash value or other indicia of the content. The content validation node may then execute a validation process to assess the validity of the content, and store data indicative of a validation result along with storing a hash (or other indicia) of the content and storing a key associated with the content validation node assessing the validity (e.g., for identification, traceability, compensation, and/or the like). The content validation node may append a transaction including the aforementioned information to a block of the content validation blockchain network; after consensus from other content validation nodes, the transaction becomes an immutable inclusion in the blockchain . . . . The blockchain may include a variety of information, including validation information that can be used by the content validation node to verify the trustworthiness, validity, legitimacy, accuracy, etc., of the content. For example, the validation information may include a smart contract, instructions, an algorithm, a process, and/or the like, which may specify a method for validating the content as being either accurate or inaccurate (or some measure or degree of accuracy), or trusted, valid, and/or the like.

As noted above, the content validation node may use the validation information to perform a validation process for the content and store the results in the blockchain (e.g., the results of the validation process may be stored in the blockchain as a transaction). In some implementations, after validating the content as accurate or inaccurate, the content validation node may include, in a transaction/block of the blockchain, data that enables the content provider to display the status of the content (e.g., accurate or inaccurate, etc.). For example, the content validation node may store, in a transaction of a block, a score or result of the validation process and/or the status of the validation process for the content (e.g., accurate, inaccurate, trusted, untrusted, legitimate, verification in progress, and/or the like). In some implementations, a validation wrapper device may interface with the content validation nodes of the content validation network to facilitate the display of the status of the content. For example, the validation wrapper device may provide a service (e.g., a website, an application, a browser extension, file server, and/or the like) capable of obtaining content validation information from the content validation network (e.g., from the blockchain, or the content validation node) and providing the content provider and/or a user device with the data that enables the content provider and/or user device to display the status of the content (e.g., directly, through a website, via email, through an application, through a browser extension, and/or the like). For example, the validation wrapper device may provide the content provider with instructions that may be added to a web page that the content provider uses to display the content, and the instructions may cause the web page (e.g., when displayed on a user's user device) to display, in addition to the content, an indicator that indicates that the content has been validated by the content validation network and is accurate, trustworthy, legitimate, valid, and/or the like.

In this way, one or more content validation nodes (and/or validation wrapper device) may enable content providers to obtain independent validation of content provided by the content provider. The use of blockchain technology enables the content validation process to be open and available for inspection, including available for inspection by users and content providers. In addition, due to blockchain technology being secured by cryptography and highly resistant to modification, content providers and users may be assured that the validation process was properly, and consistently, performed for any given content of a plurality of content providers. For content validation nodes, and the entities that operate the content validation nodes, some implementations enable compensation or other incentives to be provided to the entities (e.g., miners) associated with the content validation nodes in a manner designed to be transparent to all users associated with the validation network and content validation process. In addition, by performing content validation using a network of content validation nodes, significant computing resources may be conserved and the content validation process may be performed faster, relative to manual content validation approaches and/or non-distributed validation performed by a single entity. Furthermore, the use of the network of content validation nodes may provide trustworthiness with respect to validation determinations, as opposed to content validation methods that might not be as independent, open, secure, objective, and/or resistant to modification.

FIG. 1 is a diagram of an overview of an example implementation 100 described herein. As shown in FIG. 1, example implementation 100 may include a content provider device and one or more content validation nodes. In some implementations, the content provider device may be a computing device (e.g., a server computer, personal computer, and/or the like) associated with an entity that provides digital content (e.g., a news organization, an individual, a business organization, and/or the like). The content validation nodes may include, in some implementations, a variety of different types of devices (e.g., server computers, personal computers, and/or the like) that communicate with one another regarding content validation (e.g., via a network).

As shown in FIG. 1, and by reference number 110, the content provider device provides content data to at least one of the content validation nodes (referred to herein as "the content validation node," even though there might be multiple content validation nodes performing the functions described below). For example, the content provider device may broadcast content data, or otherwise make content data available, in a manner designed to enable the content validation nodes to receive the content data (e.g., by a web crawler or other content aggregator, and/or from a user requesting content validation), or the content provider device may send the content data directly to the content validation node. In some implementations, a validation wrapper device may be used to provide an interface between the content provider device or user device and the content validation nodes (e.g., a validation wrapper device may receive content data from content provider device or user device and provide the content data to one or more content validation nodes for validation). A variety of information may be included in the content data. For example, the content data may include data identifying the content (e.g., a network address, such as a universal resource locator (URL)), data identifying the content provider (e.g., a content provider identifier, such as a public key associated with an author or source and/or other entity associated with the content), a hash value of the content (e.g., a secure hash algorithm 2 (SHA-2) hash of the text included in or otherwise representing the content), and/or the like. In the example implementation, the content data includes data identifying a news article.

As further shown in FIG. 1, and by reference number 120, the content validation node accesses or generates a blockchain associated with content validation. In some implementations, multiple different blockchains may be used to perform content validation (e.g., different blockchains for different content providers, different content validation methods, different smart contracts, and/or the like). In some implementations, a single blockchain may be used to perform content validation (e.g., content from any or all content providers may be validated in the same blockchain). In a situation where multiple blockchains are used, and a content validation blockchain already exists, the content validation node may, for example, use the data identifying the content and/or data identifying the content provider to identify and access the blockchain associated with the content data. In a situation where no blockchain associated with the content data exists, the content validation node may generate a blockchain (e.g., a genesis block) for the content data and/or content provider (e.g., using the data identifying the content and/or data identifying the content provider). In implementations where a single blockchain is used, the content validation node accesses the blockchain associated with the content data (e.g., accesses the smart contract included in the content validation blockchain). As described in further detail below, the blockchain may include a variety of information.

As further shown in FIG. 1, and by reference number 130, the blockchain associated with the content data (e.g., the blockchain accessed or generated at reference number 120) may include a variety of information. In the example implementation 100, the blockchain includes content information, validation information, validation results, and blockchain data. Content information may include the content itself and/or information related to the content (e.g., the content associated with the blockchain), such as the data identifying the content (e.g., network address), data identifying the content provider (e.g., content provider identifier, author public key, and/or the like), a hash (or other indicia) of the content, data identifying history of the content (e.g., different versions of the content), and/or the like. Validation information may include information related to how the content is to be validated (e.g., specified in executable instructions, such as a smart contract), such as a validation method, algorithm, or process, including criteria, sources, and/or the like, which may be used to determine the accuracy, trustworthiness, legitimacy, validity, etc. of the content. Validation results may include information related to results of performing validation and may be stored as transactions in the blockchain. The validation results may depend on the method used for validation, and may include, for example, scores, values, and/or thresholds for various criteria used to determine the accuracy, trustworthiness, legitimacy, validity, etc. of the content. Blockchain data may include information to enable the blockchain to function and may include, for example, data identifying blocks of the blockchain (e.g., pointers to previous and/or next blocks), access control information used to restrict entities that are permitted to edit the blockchain, and/or the like.

As further shown in FIG. 1, and by reference number 140, the content validation node performs validation of the content using the validation information (e.g., the smart contract) in the blockchain. By way of example, the validation information may include an algorithm for evaluating the accuracy or trustworthiness, etc. of news articles by assigning values, or scores, for various attributes of the news article, such as a score for the number of quotes used, a score for the number of references provided, a score for grammar, and/or the like. The example algorithm may also include weights for the various scores and a method of combining the scores to produce a final score, or rating, for the news article. The final score may be compared to predetermined thresholds to determine whether the news article is likely to be accurate, inaccurate, or somewhere in between.

As further shown in FIG. 1, and by reference number 150, the content validation node stores the results of the validation process in the blockchain. Using the example above, the individual scores determined for the news article, and the final score and accuracy determination, may be stored in the blockchain. In some implementations, when storing the validation results in the blockchain, the content validation node may store the results in one or more transactions associated with the blockchain (e.g., in a data structure designed to be resistant to modification, such as a Merkle tree, hash list, and/or the like). In a situation where validation was previously performed on the content, in some implementations, a new block for the blockchain may be created to store the validation results.

As further shown in FIG. 1, and by reference number 160, the content validation node may generate content validation data based on the validation results. The content validation data is data that provides an indication of the accuracy of the content, e.g., as determined based on the validation results. Many different types of content validation data may be used, and in some implementations the content validation data may depend on the type of content being validated. Example content validation data may include data indicating the results of validation (e.g., the score(s) and/or ultimate determination regarding content accuracy, legitimacy, trustworthiness, etc.), data that causes display of some indication regarding the validation results (e.g., web page instructions that cause a visual element to be displayed indicating the validation results), data that causes some indication regarding validation results to be embedded in the content (e.g., a digital watermark embedded in a digital document), and/or the like.

As further shown in FIG. 1, and by reference number 170, the content validation node may provide the content validation data to the content provider device. In some implementations, a validation wrapper device may receive the content validation data (e.g., by accessing the blockchain where the content validation data is stored, or by receiving the content validation data from the content validation node) and provide, or otherwise make available, the content validation data to the content provider device and/or a user device. In the example implementation 100, the content validation data includes data that causes a web page displaying the article to change its background and to also include the language, "Validated Jan. 1, 2018," to be displayed with the news article. The content validation data may, in this example, include a network address for a web page constructed by the content validation wrapper device or data that, when added to the original web page that displays the news article, causes the web page to be displayed with the visual indicators (e.g., the background change and the text). Providing the content provider device with content validation data may enable the content provider to provide some indication of the accuracy, trustworthiness, legitimacy, validity, etc. of the content provider's content to users who consume the content.

As noted above, in this way, one or more content validation nodes (and/or validation wrapper device) may enable content providers to obtain independent validation of content provided by the content providers. The use of blockchain technology enables the content validation process to be open and available for inspection, including available for inspection by users and content providers. In addition, due to blockchain technology being secured by cryptography and highly resistant to modification, content providers and users may be assured that the validation process was properly performed for any given content. For content validation nodes, and the entities that operate the content validation nodes, some implementations enable compensation or other incentives to be provided to the entities associated with the content validation nodes in a manner designed to be transparent to all users associated with the validation network and content validation process. In addition, by performing content validation using a network of content validation nodes, significant computing resources may be conserved and the content validation process may be performed faster, relative to manual content validation approaches and/or non-distributed validation performed by a single entity. Furthermore, the use of the network of content validation nodes may provide trustworthiness with respect to validation determinations, as opposed to content validation methods that might not be as independent, open, secure, objective, and/or resistant to modification.

As indicated above, FIG. 1 is provided merely as an example. Other examples are possible and may differ from what was described with regard to FIG. 1.

Figure 2:
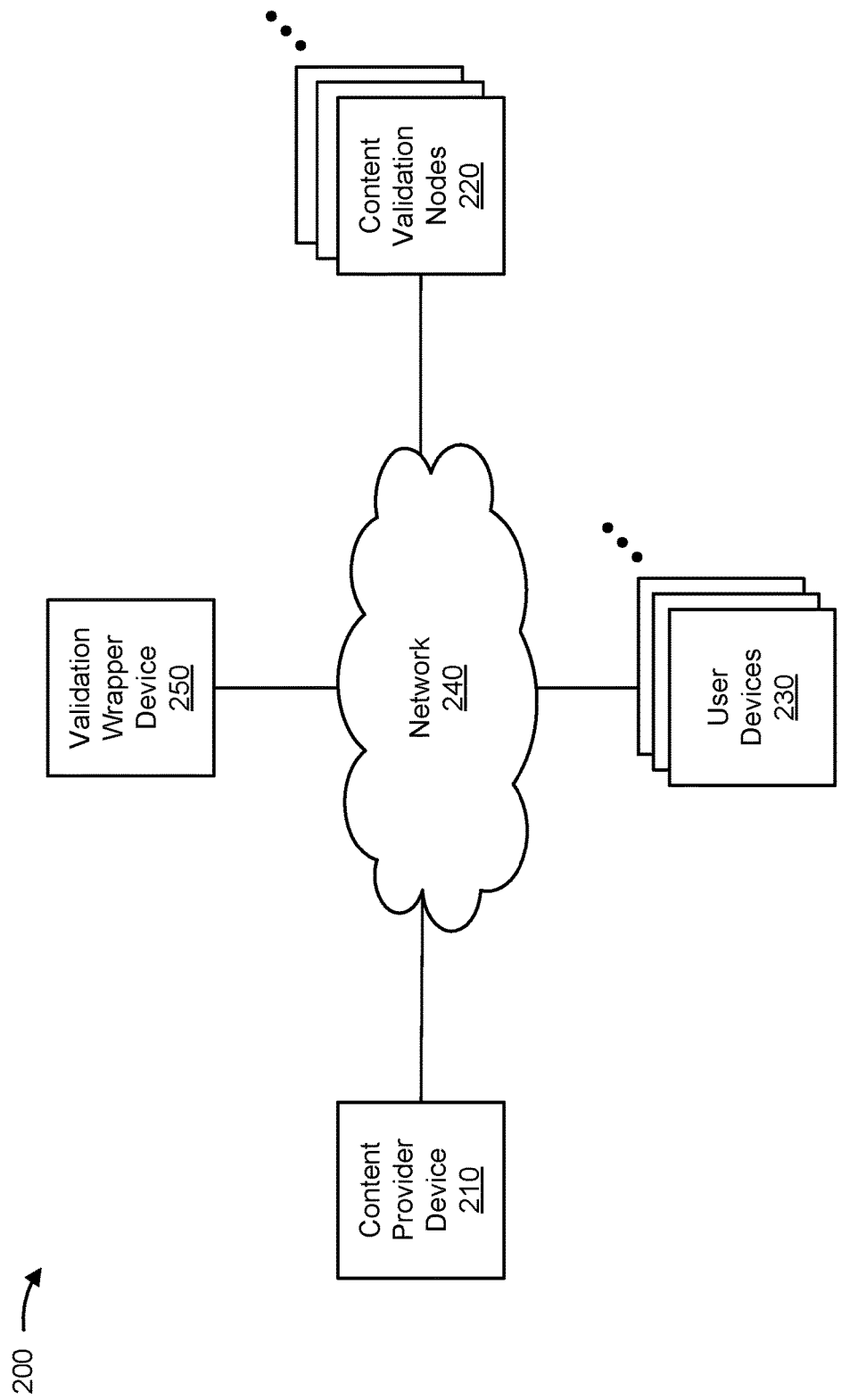
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a content provider device 210, one or more content validation nodes 220, user devices 230, network 240, and validation wrapper device 250. Devices of environment 200 may interconnect via wired connections, wireless connections, or a combination of wired and wireless connections.

Content provider device 210 includes one or more devices capable of receiving, generating, storing, processing, and/or providing information associated with content, such as digital content. For example, content provider device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, a server device, a group of server devices, a network device (e.g., a firewall, a router, a gateway, a switch, a hub, a bridge, a reverse proxy, a proxy server, a security device, an intrusion detection device, a load balancer, etc.), or a similar type of device. In some implementations, content provider device 210 is associated with a content provider (e.g., an entity that provides digital content). For example, the content provider device 210 may be a personal computer of a user associated with an organization that provides content, a web server that provides a website for content, and/or the like. Content provider device 210 may be capable of providing one or more content validation nodes 220 and/or validation wrapper device 250 with content data, which may include the capability to hash content (e.g., using a hashing application installed on content provider device 210).

Content validation node 220 includes one or more devices capable of receiving, generating, storing, processing, validating, and/or providing information associated with content and blockchains. For example, content validation node 220 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a server device, a group of server devices, a network device (e.g., a firewall, a router, a gateway, a switch, a hub, a bridge, a reverse proxy, a proxy server, a security device, an intrusion detection device, a load balancer, etc.), a cloud computing device, a data center device, or a similar type of device.

In some implementations, content validation node 220 may include hardware and/or software to enable storage and manipulation of blockchains and communications with other content validation nodes 220 (e.g., via network 240). For example, content validation node 220 may include a data storage device for storing one or more blockchains. In some implementations, multiple content validation nodes 220 may collectively provide a content validation service, e.g., where any one content validation node 220 (or multiple content validation nodes 220) may be able to provide content validation services using one or more blockchains maintained by a network of content validation nodes 220. In some implementations, one or more content validation nodes 220 may be designated as a central authority for a content validation service, e.g., the central authority being a content validation node 220 that may provide identity and access management functions, genesis block creation for new blockchains, and/or the like for the network of content validation nodes 220.

In some implementations, one or more of the functions performed by content validation node 220 may be hosted in a cloud computing environment or may be partially hosted in a cloud computing environment. In some implementations, content validation node 220 may be a physical device implemented within a housing, such as a chassis. In some implementations, content validation node 220 may be a virtual device implemented by one or more computer devices of a cloud computing environment or a data center.

User device 230 includes one or more devices capable of receiving, generating, storing, processing, and/or providing information associated with content. For example, user device 230 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 230 may include one or more applications designed to enable user device 230 to consume digital content, such as a web browsing application, document processing application, image viewing application, and/or the like.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Validation wrapper device 250 includes one or more devices capable of receiving, generating, storing, processing, and/or providing information associated with content and blockchains. For example, validation wrapper device 250 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), server device, a group of server devices, a network device or a similar type of device. In some implementations, validation wrapper device 250 may provide an interface between content provider device 210 and content validation nodes 220. For example, validation wrapper device 250 may include one or more applications and/or services designed to enable content provider device 210 to provide content data to content validation nodes 220 for validation, and enable content provider device 210 to receive results of content validation. Validation wrapper device 250 may provide, for example, a website designed to enable content provider device 210 and/or user device 230 to submit data identifying content, and validation wrapper device 250 may communicate with content validation nodes 220 to cause the content validation process to occur. Validation wrapper device 250 may also provide an interface between user devices 230 and the blockchain, to enable users to request or verify a validation of content. In some embodiments, validation wrapper device 250 may provide a website, browser extension, application, and/or the like, for receiving validation/verification requests and for providing details of a validation result.

While validation wrapper device 250 and user device 230 are shown separately in FIG. 2, in some implementations, validation wrapper device 250 and user device 230 may be implemented on the same hardware device. For example, validation wrapper device 250 may include a smart phone operated by a user, the smart phone including a first application (e.g., a web browser application, content provider application, or the like) for browsing content provided by content providers associated with content provider device 210, and a second application (e.g., a web browser extension application, application plugin, or the like) for interfacing with content validation nodes 220. In this example, a user may use the first application to browse content, and the second application to communicate with the blockchain, cause content validation to occur, and/or display results of the content validation on the smart phone.

In some implementations, one or more of the functions performed by validation wrapper device 250 may be hosted in a cloud computing environment or may be partially hosted in a cloud computing environment. In some implementations, validation wrapper device 250 may be a physical device implemented within a housing, such as a chassis. In some implementations, validation wrapper device 250 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
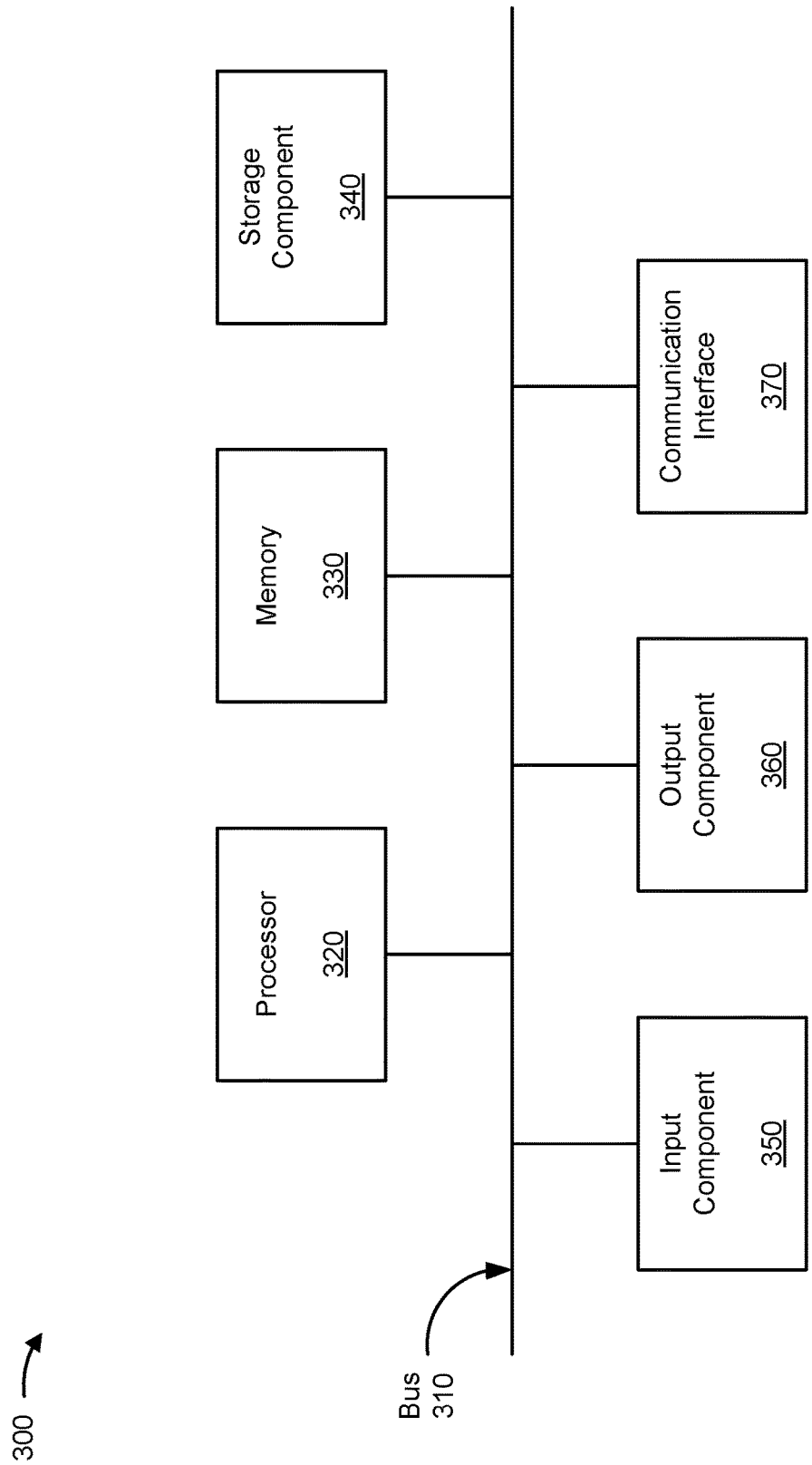
FIG. 3 is a diagram of example components of one or more devices of FIG. 2.

FIG. 3 is a diagram of example components of a device 300. Device 300 may correspond to content provider device 210, content validation node 220, user device 230, and/or validation wrapper device 250. In some implementations, content provider device 210, content validation node 220, user device 230, and/or validation wrapper device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
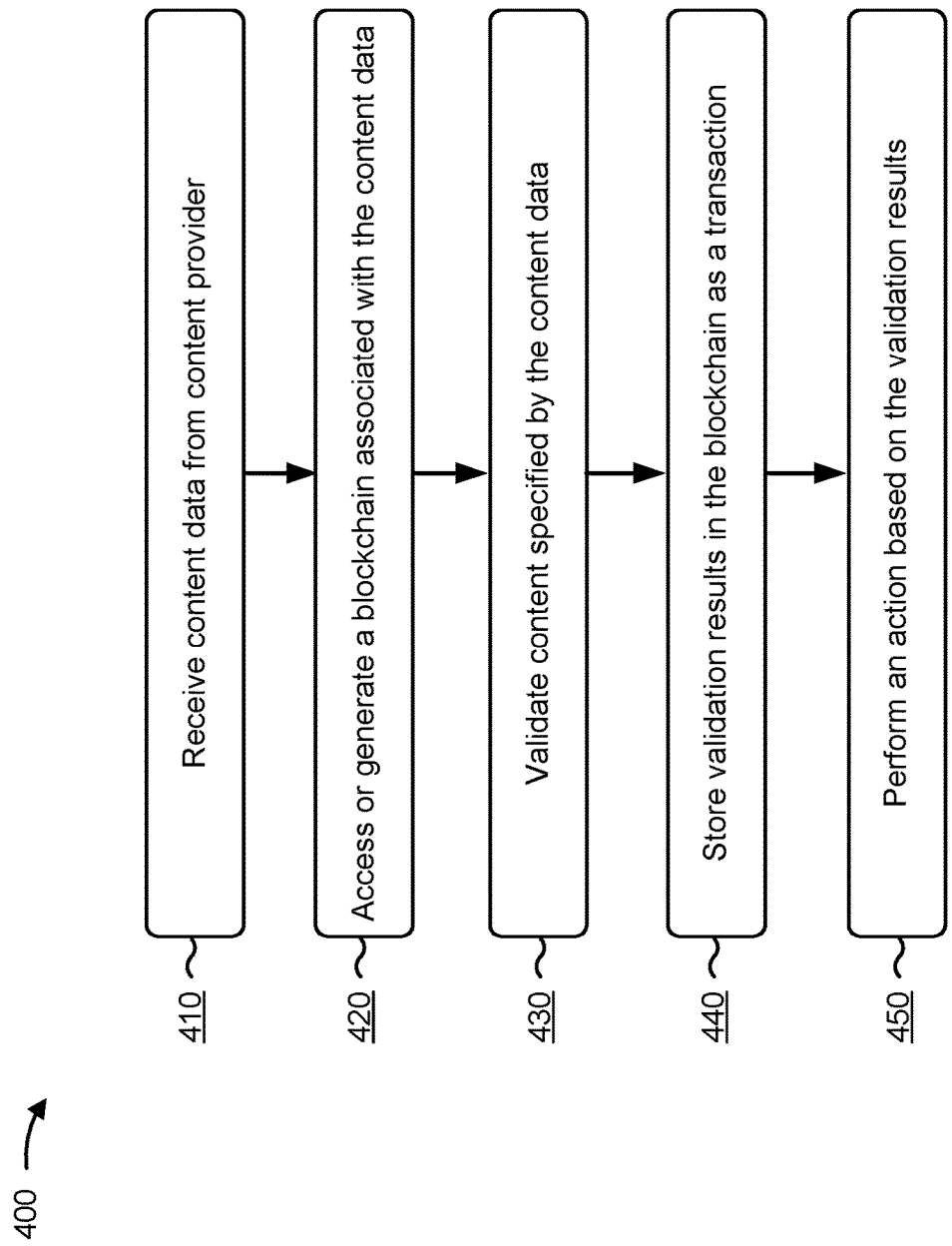
FIG. 4 is a flow chart of an example process for performing content validation using a blockchain.

FIG. 4 is a flow chart of an example process 400 for performing content validation using a blockchain. In some implementations, one or more process blocks of FIG. 4 may be performed by a content validation node 220, though, in practice, different process blocks might be performed by different content validations nodes 220 or a single one of these process blocks might be performed collectively by multiple content validation nodes 220. In some implementations, one or more process blocks of FIG. 4 may be performed by another device or a group of devices separate from or including content validation nodes 220, such as content provider device 210, user device 230, or validation wrapper device 250.

As shown in FIG. 4, process 400 may include receiving content data from a content provider (block 410). For example, content validation node 220 may receive (e.g., using processor 320, communication interface 370, and/or the like) content data from content provider device 210. In some implementations, content validation node 220 may receive content data from validation wrapper device 250 (e.g., validation wrapper device 250 may have been previously provided with content data from content provider device 210 or receive a user request to validate content from user device 230). Content data may include a variety of information related to content that is provided or will be provided by the content provider associated with content provider device 210.

Content data may include, for example, data identifying the content, a hash of the content, data identifying the content provider, incentive information (e.g., including compensation information), and/or the like. Data identifying the content is designed to enable content validation node 220 to identify the content and may include, for example, a network address associated with the content (e.g., a universal resource locator (URL)).

The hash (or other indicia) of the content is designed to provide reasonable or cryptographically secured assurance that the content to be validated matches the content identified in the content data. For example, by providing content validation node 220 with a hash of the content, content validation node 220, or another device, may obtain the content (e.g., from the network address provided in the content data), hash the content, and compare the results to the hash that was provided in the content data to ensure that the content being validated matches the content that the content provider is making available to users.

The data identifying the content provider may be any identifier, including, for example, a public key associated with the content provider or some other form of identification. The data identifying the content provider may be used in a variety of ways, such as an identifier for identifying the blockchain to be used to validate the content, an identifier enabling a transfer of compensation from the content provider, and/or the like.

Compensation information, or incentive information, may include information designed to enable an entity associated with content validation node 220 to be provided with compensation for performing the validation process on the content. Compensation information may include, for example, a smart contract designed to trigger a transfer of funds or another incentive upon completion of the validation, an amount of compensation offered for performing the validation, account data associated with the content provider, and/or the like.

While the examples above provide several different types of information that may be included in content data, content validation node 220 may receive a variety of information in content data, including more, less, and/or different information than that provided in the examples. In this way, content validation node 220 may receive content data from a content provider, enabling content validation node 220 to access or generate a blockchain associated with the content data and perform a content validation process on the content (e.g., to determine the accuracy of the content).

As further shown in FIG. 4, process 400 may include accessing or generating a blockchain associated with the content data (block 420). For example, content validation node 220 may access or generate (e.g., using processor 320, memory 330, storage component 340, and/or the like) a blockchain associated with the content data. The blockchain may be associated with the content data based on the blockchain being used for validating the content data. In some implementations, content validation node 220 may access a blockchain associated with the content data by accessing data included in a pre-existing blockchain associated with validating content. In some embodiments, a pre-existing blockchain may be associated with the content provider or type of content data, or based on some other association with the content data. For example, information included in the content data may be used to identify existing blockchain data stored by or otherwise accessible to content validation node 220. In some implementations, content validation node 220 may generate a blockchain (e.g., in a situation where no pre-existing blockchain, or no pre-existing blockchain associated with the content data, exists). For example, information included in the content data may be used to generate a genesis block to start a blockchain for the content data. In some implementations, one blockchain may be used to perform content validation. In this situation, content validation node 220 may access the data included in the blockchain based on receipt of the content data (e.g., the content data may include information indicating that the content data is to be validated).

In a situation where no blockchain exists yet for the content data, content validation node 220 may generate a blockchain. For example, content validation node 220 may generate a genesis block for the blockchain that is to be associated with the content data. The genesis block may include, for example, a timestamp, and an index value associated with the content provider or the content (e.g., an identifier associated with the content or content provider), a smart contract, and other information that may be included in the content data (e.g., data identifying the content, the hash of the content, compensation information, and/or the like).

In some implementations, content data may be included in a block of the blockchain that is different from the genesis block, such as a second block in the blockchain. Additional blocks, such as the second block, may include a hash of data associated with the previous block in the blockchain, in a manner designed to enhance the security of the blockchain as more blocks are added. The blockchain may also include validation information, e.g., executable code, such as a smart contract, including instructions that enable content validation node 220 to perform validation on the content.

In some implementations, any content validation node 220 may generate a blockchain to be associated with content data, and in some implementations (e.g., in a permissioned blockchain), a content validation node 220 acting as the central authority for a permissioned blockchain validation service may generate the blockchain. In a situation where content validation node 220 generates a new blockchain, content validation node 220 may notify other content validation nodes 220 of the creation of the new blockchain, e.g., in a manner designed to enable the other content validation nodes 220 to update their blockchain data storage accordingly. While the foregoing describes one example implementation for generating a blockchain associated with content data, other methods for generating a blockchain may be used, including methods that include more information, less information, and/or different information in the blockchain.

In a situation where a blockchain associated with the content data already exists, content validation node 220 may access data stored in the blockchain (e.g., executable instructions stored in a smart contract). In some implementations, the blockchain may be associated with content validation (e.g., for all content, in implementations where all content validation is performed based on one blockchain). When accessing the blockchain, content validation node 220 may access a most recent block in the blockchain, which may include a variety of information, such as transactions for previous content validations, or the information described as being included in the blockchain when generated (e.g., smart contract information, information included in the content data, validation information, and/or the like). In some implementations, such as an implementation involving a permissioned blockchain, an existing transaction, block, or blockchain may have been previously generated by one or more different content validation nodes 220 (e.g., separate content validation nodes 220 included in a distributed system of content validation nodes 220), where portions of a content validation process may be performed by different content validation nodes 220.

While the examples above indicate that content validation node 220 accesses or generates a block and/or blockchain (e.g., including generating a new block or a genesis block on a blockchain) associated with the content data, in some implementations, content validation node 220 may, more specifically, access or generate a block or transaction associated with the content data. For example, a blockchain may be associated with many types of content data, and each transaction in a block of the blockchain may correspond to particular content (e.g., with validation results associated with the particular content being included in a transaction associated with the particular content). In this situation, content validation node 220 may access or generate a particular block of a blockchain that is associated with validating the content data.

In this way, content validation node 220 may access or generate a blockchain associated with the content data, enabling content validation node 220 to use data included in the blockchain (e.g., executable instructions, such as a smart contract) to perform validation of the content associated with the content data (e.g., in a manner designed to determine the accuracy of the content).

As further shown in FIG. 4, process 400 may include validating content specified by the content data (block 430). For example, content validation node 220 may validate (e.g., using processor 320, memory 330, storage component 340, and/or the like) the content specified by the content data. Validating the content includes determining whether the content is accurate, legitimate, trustworthy, valid, and/or the like, based on information included in (or a protocol of) a content validation blockchain. For example, the content validation blockchain may include validation information (e.g., executable instructions, such as a smart contract, algorithm, process, method, formula, and/or the like) designed to enable content validation node 220 to validate the content.

The validation information included in the blockchain provides the manner in which the content is to be validated, e.g., the manner in which the accuracy or validity, etc. of the content is to be determined. For example, the validation information may include an algorithm that specifies instructions for content validation node 220 to follow to determine the accuracy of the content. The algorithm may take a variety of forms, and may use a variety of techniques for determining the accuracy of the content. For example, an algorithm may direct content validation node 220 to analyze various features of text, including analyzing other sources of information (e.g., similar news articles, scholarly articles, literature, and/or the like), to determine whether textual content is accurate. To validate content that includes an image, an algorithm may direct content validation node 220 to analyze the image to determine whether image editing software may have been used on the image and/or may compare the image to other images that might be available from other sources (e.g., other websites). To validate content that includes audio or video, an algorithm may direct content validation node 220 to analyze the audio to determine whether audio/video editing software may have been used to edit the audio and/or may compare the audio/video to other copies of the audio/video that might be available from other sources.

An algorithm to determine the accuracy of content may, for example, evaluate one or more features associated with the content (e.g., spelling accuracy, grammatical accuracy, number of quotations used, and/or the like), where each feature is designed to provide an indication regarding the accuracy of the content. In some implementations, content validation node 220 may produce a score or other indicator that indicates whether the content is likely to be accurate, inaccurate, or if accuracy cannot be determined. In some implementations, an algorithm or formula to determine the accuracy of content may be a supervised or unsupervised machine learning model, such as a model that has been trained to receive, as input, one or more content features and produce, as output, a measure of likelihood that the content is accurate.

The validation information (e.g., and any included algorithm, process, method, formula, and/or the like) may be predetermined at the time a blockchain associated with the content is created. For example, when creating a blockchain for content validation, a smart contract (or a plurality of chained smart contracts) that includes the content validation information may have been previously determined by an entity that developed the smart contract. As another example, when using a permissioned blockchain, content validation node 220 may include the validation information in the blockchain at the time the blockchain is created (e.g., by using a stored copy of validation information and/or obtaining the validation information from a central authority approved for providing validation information for a network of content validation nodes 220).

Content validation node 220 may, in some implementations, update the validation information. An update to the validation information may, for example, be provided by content validation node 220 acting as a central authority for a network of content validation nodes 220. As another example, validation information may be updated based on adoption of the updated validation information by a consensus of content validation nodes 220 included in the network of content validation nodes 220. In some implementations, an update to validation information may cause content validation node 220 to re-validate previously validated content with the updated validation information. In some implementations, an update to validation information may cause content validation node 220 to use the updated validation information for future content validations. In some implementations, content validation node 220 may perform content validation using updated validation information on a subset of previously validated content (e.g., a subset defined by data included in or otherwise associated with the updated validation information).

By way of example, content validation node 220 may perform validation of content associated with content data by evaluating features that include one or more parameters (e.g., validation parameters) that each provides an indication of the accuracy, trustworthiness, legitimacy, validity, etc. of the content. Example parameters may include a value indicating a measure of confidence that quotes included in the content are accurate, a value indicating a measure of confidence that a title associated with the content matches a meaning associated with the content, a value indicating a measure of confidence that the content provider is a provider of valid content, a value indicating a peer consensus score that indicates a degree to which peers of the content provider are associated with peer content similar to the content, a value indicating a measure of confidence that facts presented in the content are accurate, a value indicating a measure of quality associated with a grammar of the content, a value indicating a measure of quality associated with a tone of the content, and/or the like. The example values, and/or other values that provide an indication of the accuracy, trustworthiness, legitimacy, validity, etc. of the content, may be determined in a variety of ways, including being determined directly by content validation node 220 (e.g., using instructions included in the validation information) and/or determined by one or more third party devices from which content validation node 220 may request the value(s).

For example, content validation node 220 may determine the value indicating the measure of confidence that quotes included in the content are accurate based on a number of quotes included in the content, the number of quotes included in the content relative to non-quote text included in the content, the length of quotes that are included in the content, modifications to quotes included in the content (e.g., indicated by square brackets). The measure of confidence for quotes may also be determined by comparing quotes included in the text to determine the number of other sources available for that quote (e.g., determined by searching and comparing the usage of a given quote in other content from other content providers).

As another example, content validation node 220 may determine the value indicating the measure of confidence that a title associated with the content matches a meaning associated with the content using one or more textual analysis techniques. For example, a textual analysis technique designed to determine the meaning of text may be applied to the title of the content and the content as a whole, or to various portions of the content, in a manner designed to determine how well the derived meaning of the title matches the derived meaning of the remainder of the content. The textual analysis techniques may include, for example, classification of text, text clustering, concept and/or entity extraction, sentiment analysis, document summarization, entity relationship modeling (e.g., learning relationships between entities), and/or the like. A low confidence in the meaning of the title matching the meaning of the content may reduce the likelihood that content is determined to be accurate or trustworthy, relative to situations where content validation node 220 has a high confidence that the meaning of the title matches the meaning of the content.

Content validation node 220 may, as another example, determine the value indicating the measure of confidence that the content provider is a provider of valid, trustworthy, or accurate content by analyzing a history associated with the content provider or a source or author associated with the content provider. For example, content validation node 220 may consider, in evaluating the history of a content provider, previous determinations regarding the accuracy, trustworthiness, legitimacy, validity, etc. of content provided by the content provider. Other measures of content provider reputation may also be used, including third party measures of content provider reputation or history for accuracy. A higher confidence that the content provider is a provider of accurate content may increase the likelihood that content validation node 220 determines the content is accurate, relative to a lower confidence that the content provider is a provider of accurate content. In some implementations, the measure of confidence that the content provider is a provider of valid, trustworthy, or accurate content may be determined, at least in part, based on an affiliation or other characteristic of the content provider, such as a geographic location or organization with which the content provider is affiliated. In addition, a category or subject of the content may also affect the measure of confidence. By way of example, in a situation where the content includes political content, and the content provider is affiliated or otherwise associated with an organization or geographic location associated with a lack of political knowledge and/or political bias, the measure of confidence (that the source is accurate, trustworthy, etc.) may be relatively low.

Content validation node 220 may, as another example, determine the value indicating the peer consensus score that indicates a degree to which peers of the content provider are associated with peer content similar to the content. The peer consensus score may be determined, for example, by evaluating the extent to which the content has been peer reviewed. Additionally, or alternatively, the peer consensus score may be determined by evaluating content provided by other content providers to determine similarities between the content and content provided by other content providers. The comparison may be performed, for example, using textual analysis techniques designed to determine features of the text that indicate a meaning associated with the text (e.g., textual analysis techniques similar to those used to determine whether the meaning of the title of the content matches the remainder of the content).

Content validation node 220 may, as another example, determine the value indicating the measure of confidence that facts presented in the content are accurate by performing textual analysis to identify facts included in the content and independently verify the facts using other sources of information. For example, content validation node 220 may use a third party fact checking service and/or search for independent reliable sources of facts that are included in the content. Content validation node 220 may determine that a higher ratio of facts in the content that can be independently verified (relative to those that cannot be independently verified), the higher the measure of confidence in the accuracy of the facts. In addition, facts within the content that are determined to be inaccurate (e.g., based on counter-facts available from other sources), may result in a low confidence that the facts presented in the content are accurate. In some implementations, inaccurate facts may be associated with a separate parameter (e.g., in a manner designed to enable a high weight to be assigned to an inaccurate fact parameter, enabling effective penalization for the use of inaccurate facts).

Content validation node 220 may, as another example, determine the value indicating the measure of quality associated with a grammar of the content using a textual analysis technique. Grammar analysis techniques may be used to identify grammatical errors, which may provide an indication regarding the lack of professionalism associated with the content, which may reduce the confidence that the content provider is a high quality source of content. Similarly, spell checking techniques may be used by content validation node 220 for the same purpose (e.g., errors reducing the confidence that the content provider is a high quality source of content). In some implementations, content validation node 220 may determine that a quality associated with the content provider (e.g., determined based on grammar and spelling analysis of the content) may affect the confidence in the accuracy, trustworthiness, legitimacy, validity, etc. of the content provided by the content provider.

Content validation node 220 may, as another example, determine the value indicating the measure of quality associated with a tone of the content using one or more textual analysis techniques and/or third party analysis. For example, a sentiment analysis technique may be used to provide an indication of the tone of the content (e.g., aggressive, informative, defensive, and/or the like). Additionally, or alternatively, the format and content of text included in the content may provide an indication regarding the tone of the content (e.g., use of superlative language, capitalizing all letters of a word and/or words, use of exclamation points, and/or the like). Similar to grammar and/or spelling analysis, analysis of the tone of the content may provide an indication regarding the quality of the content provider. Content validation node 220 may determine that the quality associated with the content provider may affect the confidence in the accuracy, trustworthiness, legitimacy, validity, etc. of the content provided by the content provider.

In some implementations, content validation node 220 may determine a final score (e.g., an evaluation score, aggregate score, and/or the like), based on a combination of values associated with parameters that may indicate the accuracy, trustworthiness, legitimacy, validity, etc. of the content, such as two or more (or all) of the example values described above. For example, the validation information included in the blockchain may include a formula for combining the values of one or more parameters. In some implementations, values may be associated with a weight that causes some values associated with some parameters to affect the resulting final score more than other values associated with other parameters. For example, a first weight associated with the value determined for the parameter associated with how accurate the facts included in the content are, may be higher than a second weight associated with the value determined for the parameter associated with how grammatically correct the content is (e.g., causing, in this example, factual accuracy of the content to have a greater effect on the final accuracy score than grammatical accuracy of the content). As noted above, in some implementations, content validation node 220 may make use of a machine learning model to determine weights for values associated with parameters and a formula for determining a final score indicating accuracy of the content.

In some implementations, the final score may be the result of validation performed by content validation node 220. The final score may be any value, such as a value between 0 and 1, which provides an indication of the accuracy, trustworthiness, etc. of the content (e.g., 0 being completely inaccurate and/or untrustworthy and 1 being perfectly accurate and/or trustworthy). In some implementations, content validation node 220 may use one or more thresholds to determine whether the content is accurate, trustworthy, legitimate, etc. For example, a first threshold (e.g., 0.75 on a 0 to 1 scale) may be used to determine that content is accurate when the final score provided as a result of the validation process meets the first threshold. A second threshold (e.g., 0.25 on a 0 to 1 scale) may be used to determine that content is inaccurate when the final score provided as a result of the validation process does not meet the second threshold. In some implementations, a final score that is in between two thresholds may be used to determine that the accuracy of the content is identified as potentially inaccurate, of questionable accuracy, or otherwise unable to be classified as either accurate or inaccurate.

While several examples have been provided, above, for enabling content validation node 220 to validate content, a variety of other methods, algorithms, processes, and/or the like for validating content may be included in validation information of the blockchain associated with the content data. In addition, while the examples provided above are described as being performed by content validation node 220, in some implementations, multiple content validation nodes 220 may be used to validate content. For example, one content validation node may perform a portion of the content validation process (e.g., performing grammar and spelling analysis, and/or the like), while another content validation node performs a different portion of the content validation process (e.g., performing content tone analysis, and/or the like). In this way, content validation node 220 may validate the content specified by the content data, enabling content validation node 220 to determine whether the content is accurate, trustworthy, legitimate, valid, etc., and store the results of the validation in the blockchain associated with the content data, and perform an action based on the results.

As further shown in FIG. 4, process 400 may include storing validation results in the blockchain as a transaction (block 440). For example, content validation node 220 may store (e.g., using processor 320, memory 330, storage component 340, and/or the like) the validation results as a transaction in the blockchain associated with the content data. Transactions may be stored, for example, in one of a variety of data structures within a block of the blockchain, such as a Merkle tree, hash list, and/or the like. Content validation node 220 may store a variety of information as transaction data of a blockchain, such as values associated with parameters used to determine the accuracy of the content, including a final score and/or determination regarding accuracy, status information or a status identifier indicating the status of the validation process (e.g., in process, complete, or not started). By storing the results of validation in the blockchain as a transaction, content validation node 220 creates a record of the validation process that is open and secure (e.g., resistant to changes, due the nature of blockchain technology).

In some implementations, results for other validation processes performed by content validation nodes 220 may be stored in transaction data of a particular block of the blockchain. For example, validation results stored as transactions in a blockchain may include the results of other validation processes in a situation where other content validation nodes 220 performed some or all of the validation process on the same content, or a situation where content validation node 220 or other content validation nodes 220 performed the validation on a previous version of the content. In this situation, content validation node 220 may store the validation results as a transaction in the current block of the blockchain (e.g., by adding the results as a transaction to the data structure of transactions, such as the Merkle tree or hash list), or content validation node 220 may store the validation results in a new transaction in a new block of the blockchain.

In some implementations, whether content validation node 220 appends validation results to an existing data structure for transactions in an existing block, or creates a new block in the blockchain, may depend on the manner in which the blockchain is configured. For example, in some implementations, the blockchain may be configured in a manner designed to cause all transactions for different content (e.g., including content that has been updated) to be stored in a new block. In some implementations, the blockchain may be configured to create a new block when a limit of transactions is reached and/or when a time limit from the previous transaction has been reached.

In this way, content validation node 220 may store the validation results as a transaction in the blockchain associated with the content data, enabling content validation node 220 to provide a secure and open record of the content validation process and results.

As further shown in FIG. 4, process 400 may include performing an action based on the validation results (block 450). For example, content validation node 220 may perform (e.g., using processor 320, communication interface 370, and/or the like) an action based on the validation results. In some implementations, content validation node 220 may perform a variety of actions, including, for example, notifying other devices (such as content provider device 210, user devices 230, and/or validation wrapper device 250) regarding the results of the validation and/or generating data that enables other devices (such as content provider device 210, user devices 230, and/or validation wrapper device 250) to provide and/or perceive information regarding the results of the validation.

For example, in some implementations, content validation node 220 may provide content provider device 210 or validation wrapper device 250 with data indicating the results of the validation process. For example, in some implementations, content validation node 220 may provide content provider device 210 or validation wrapper device 250 with data indicating a determination regarding the accuracy of the content (e.g., accurate, inaccurate, or unable to verify the accuracy, trusted, etc.). In some implementations, content validation node 220 may provide content provider device 210 or validation wrapper device 250 with data indicating individual values and/or scores used to determine whether the content is accurate, trustworthy, legitimate, and/or the like. Providing content provider device 210 (or validation wrapper device 250) with data indicating the results of the validation process may enable the content provider associated with content provider device 210 (or entity associated with validation wrapper device 250) to take action based on the results (e.g., correct inaccuracies, advertise the accuracy of the content, and/or the like).

In some implementations, content validation node 220 may provide other content validation nodes 220 with data indicating the results of the validation process. For example, other content validation nodes 220 in a network of content validation nodes 220 may use the results of the validation process to update their own records regarding the validation of the content and/or to independently perform validation of the content (e.g., in a manner to provide confirmation of the validation process, which may also be stored in the blockchain).

In some implementations, content validation node 220 may provide a third party device with data indicating the results of the validation process. For example, third party devices may include user devices 230 and/or devices associated with other entities that may be interested in obtaining information regarding the validation of content, such as industry monitors, news organizations, professional organizations, and/or the like.

In some implementations, content validation node 220 may cause compensation to be transferred between accounts of entities associated with the content validation process. For example, the content provider associated with the content may offer compensation to content validation nodes 220 for validating the content to determine its accuracy. The compensation may be predetermined (e.g., by smart contract) and/or based on the content data (e.g., compensation offered by content provider). Content validation node 220 may cause compensation to be transferred to an account of an entity associated with content validation node 220 (e.g., by providing a receipt, bill, or other data to content provider device 210 or another device designated to receive the receipt, bill, or other data). In some implementations, instructions that cause the transfer of compensation may be included in a smart contract associated with the blockchain. The smart contract may include, for example, data that includes executable instructions designed to trigger the transfer of funds or another type of compensation upon a condition being met (e.g., in a manner similar to an Ethereum blockchain implementation).

In some implementations, content validation node 220 may generate data that causes presentation of an indication regarding the results of validation. For example, content validation node 220 may generate and store, in the transaction created during content validation, data that is an indication regarding the accuracy of the content to be presented when the content is presented to another device, such as user device 230. For example, the content validation node 220 may generate an audio and/or visual indication regarding whether the content is accurate. As another example, content validation node 220 may generate instructions (e.g., code) that can be inserted into a web page or web page element associated with the content (e.g., by content provider device 210 and/or validation wrapper device 250). When the instructions are executed (e.g., by a web browsing application of user device 230 when accessing the web page associated with the content), the instructions may cause presentation of some indicator regarding the accuracy of the content.

A variety of indicators may be used to indicate whether the content is accurate. For example, audio indicators may include an audio clip of a voiceover indicating whether the content is accurate. Example visual indicators may include a web page watermark (including a digital watermark designed to be hidden in the web page source code), a background pattern or color, a pop-up displaying validation results, a web page element capable of presenting a variety of graphics and/or other information based on the validation results, an overlay on top of the content (e.g., including highlighting and/or annotations for text), text that may be added to the content that provides information based on the validation results, and/or the like. Some example visual indicators are provided and discussed below, with respect to FIGS. 6A-6D.

While some example actions are described above, content validation node 220 may be capable of performing a variety of actions designed to facilitate the validation of content to determine the accuracy, trustworthiness, legitimacy, validity, etc. of the content, enabling users consuming the content to receive assurance regarding the accuracy, trustworthiness, legitimacy, validity, etc. of the content.

In this way, content validation nodes 220 may enable content providers to obtain independent validation of content provided by the content provider. The use of blockchain technology enables the content validation process to be open and available for inspection, including available for inspection by users and content providers. In addition, due to blockchain technology being secured by cryptography and highly resistant to modification, content providers and users may be assured that the validation process was properly performed for any given content. Using a content validation blockchain may further provide a standard for what content is considered accurate, truthful, trustworthy, and/or the like. For content validation nodes 220, and the entities that operate the content validation nodes 220, some implementations enable compensation to be provided to the entities associated with the content validation nodes 220 in a manner designed to be transparent to all users associated with a validation network and content validation process. In addition, by performing content validation using a network of content validation nodes 220, significant computing resources may be conserved and the content validation process may be performed faster, relative to manual content validation approaches. Furthermore, the use of a network of content validation nodes 220 may provide trustworthiness with respect to validation determinations, as opposed to content validation methods that might not be as independent, open, secure, and/or resistant to modification.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
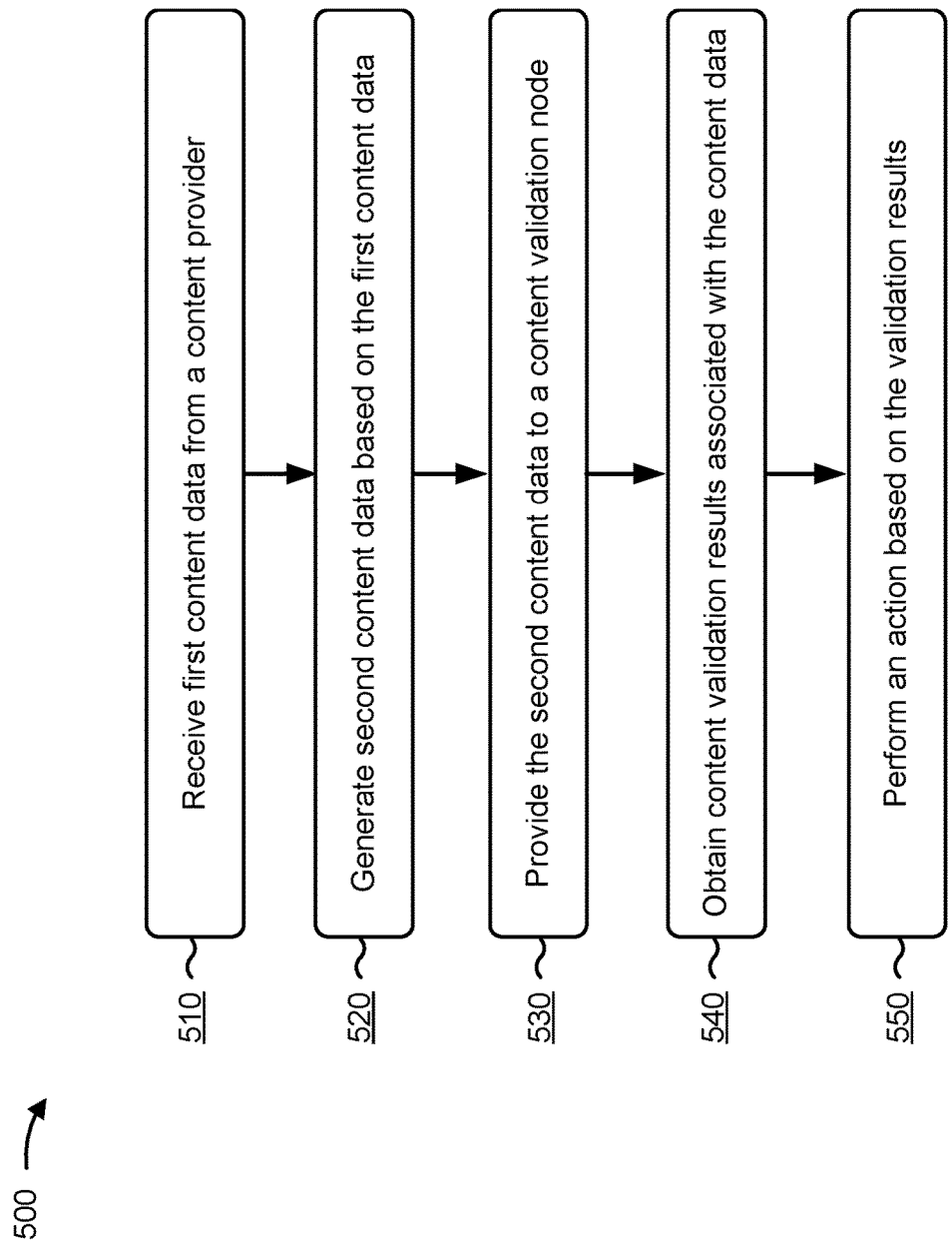
FIG. 5 is a flow chart of an example process for performing content validation using a network of content validation nodes.

FIG. 5 is a flow chart of an example process 500 for performing content validation using a network of content validation nodes. In some implementations, one or more process blocks of FIG. 5 may be performed by a validation wrapper device 250, though, in practice, different process blocks might be performed by different validation wrapper devices 250 or a single one of these process blocks might be performed collectively by multiple validation wrapper devices 250. In some implementations, one or more process blocks of FIG. 5 may be performed by another device or a group of devices separate from or including validation wrapper device 250, such as content provider device 210, content validation nodes 220, or user device 230.

As shown in FIG. 5, process 500 may include receiving first content data from a content provider (block 510). For example, validation wrapper device 250 may receive (e.g., using processor 320, communication interface 370, and/or the like) first content data from content provider device 210 or user device 230. The first content data may include content data (e.g., content data described above with reference to block 410, such as data identifying a network address of content) and, in some implementations, a variety of information related to content that is or will be provided by the content provider associated with content provider device 210 (e.g., compensation information, where validation results are to be sent, and/or the like).

By way of example, the first content data may include a URL associated with social media content that was posted to a social media website operated by the content provider associated with content provider device 210. In an implementation where validation wrapper device 250 is a standalone device, validation wrapper device 250 may receive the first content data from a content provider device 210 or user device 230 (e.g., submitted via a web page provided by validation wrapper device 250). In an implementation where validation wrapper device 250 is implemented in a user device 230, validation wrapper device 250 may receive the first content data from content provider device 210 via an application (e.g., via a web browsing application and/or web browser extension application operating on validation wrapper device 250).

In some implementations, validation wrapper device 250 may receive, separately or with the first content data, validation instructions that indicate that the content identified by the first content data is to be validated. For example, content provider device 210 may send validation wrapper device 250 instructions indicating that the content (e.g., the social media content) associated with the first content data (e.g., the URL of the social media content) should be validated (e.g., by a content validation network that includes one or more content validation nodes 220). As another example, user device 230 may send validation wrapper device 250 instructions indicating that the content associated with the first content data should be validated. The instructions may be submitted, for example, via a web page provided by validation wrapper device 250, a console, and/or the like.

In this way, validation wrapper device 250 may receive first content data from a content provider, enabling validation wrapper device 250 to generate second content data and communicate with a content validation network regarding validation of the content identified by the first content data.

As further shown in FIG. 5, process 500 may include generating second content data based on the first content data (block 520). For example, validation wrapper device 250 may generate (e.g., using processor 320, memory 330, storage component 340, and/or the like) second content data based on the first content data. The second content data may be generated using application programming interface (API) information that enables validation wrapper device 250 to format information regarding the content in a manner designed to be received by content validation node 220. In some implementations the second content data may be generated by hashing the content identified by the first content data. Using the social media content example, validation wrapper device 250 may use the URL of the social media content to obtain the content (e.g., the text included in the social media content/post). Validation wrapper device 250 may then hash the content (e.g., the text) to produce hash data.

Validation wrapper device 250 may hash the content in a variety of ways. For example, a checksum function or cryptographic hash function (e.g., Berkeley Software Distribution (BSD) checksum, Merkle-Damgard (MD) 5, secure hash algorithm 1 (SHA-1), SHA-2, cyclic redundancy check (CRC)-32, and/or the like) may be used, by providing the function with input that includes the content and receiving output that includes a hash. A hash operation may be designed, for example, to map data of arbitrary size to a bit string of a fixed size (a hash), in a manner designed to be infeasible to invert. The hash of the content may be used to determine whether the content has been changed since the hash was generated.

Using the social media content example, given a first hash obtained at a first time T1, and a second hash obtained (using the same hash function) at a second time T2, the hashes will be the same if the text of social media content has not changed. If the text of the social media content has changed in between T1 and T2, the second hash should be different. Validation wrapper device 250 may hash the content data prior to the content being validated in a manner designed to ensure that the validation process is performed on unaltered content. If content changes after it has been validated, validation wrapper device 250 may detect the change based on a change in the hash of the content, which may indicate that the previous validation of the content should be revoked, updated, flagged, and/or the like. While the example above is described with reference to using a hash to detect a change in text, a hash function may be used to detect changes in other types of content as well, including image content, audio content, video content, application content, and/or the like.

In some implementations, the second content data may include other information designed to facilitate content validation. For example, validation wrapper device 250 may include a portion or all of the first content data in the second content data, the content identified by the first content data may be included in the second content data, and any data that might be used by content validation node 220 to perform content validation may also be included in or sent contemporaneously with the second content data. For example, a smart contract implemented by content validation node 220 may request a timestamp indicating a time validation wrapper device 250 obtained the hash data. As another example, information related to any of the example parameters used by content validation node 220 described above (e.g., with reference to block 430), may be obtained by validation wrapper device 250 and included in the second content data (such as an author for the content, a publisher associated with the content, a title associated with the content, and/or the like).

In this way, validation wrapper device 250 may generate second content data based on the first content data, enabling validation wrapper device 250 to provide content validation node 220 (e.g., of a content validation network) with data that enables content validation to be performed.

As further shown in FIG. 5, process 500 may include providing the second content data to a content validation node (block 530). For example, validation wrapper device 250 may provide (e.g., using processor 320, output component 360, communication interface 370, and/or the like) the second content data to content validation node 220. Validation wrapper device 250 may, for example, provide the second content data to content validation node 220 via network 240.

Validation wrapper device 250 may provide the second content data to content validation node 220 in a variety of ways. For example, a smart contract implemented by content validation node 220 may provide (e.g., via an API) validation wrapper device 250 with information designed to enable validation wrapper device 250 to communicate the second content data (and/or any additional information to be used for content validation) to content validation node 220. Using the social media content example, validation wrapper device 250 may use an API associated with the smart contract implemented on content validation node 220 to communicate the hash of the social media content and the URL of the social media content to content validation node 220. As another example, validation wrapper device 250 may broadcast the second content data to the network of content validation nodes 220, e.g., in a manner designed to enable one or more of the content validation devices to accept the second content data and begin a content validation process for the associated content.

In some implementations, multiple blockchains may exist for content validation (e.g., a separate blockchain for different types of content and/or different content providers, or the like). In this situation, validation wrapper device 250 may identify the blockchain network to send the second content data, based on the information associated with the content provider and/or information included in the first content data. Validation wrapper device 250 may identify the blockchain, for example, based on data identifying the content provider and/or data identifying the content. For example, in some implementations, the blockchain may be associated with a content provider and include an identifier of the content provider. In some implementations, the blockchain may be associated with the content and include an identifier for the content. In some implementations, the blockchain may be associated with content validation (e.g., for all content, in implementations where all content validation is performed based on one blockchain). After identifying the blockchain to which second content data is to be provided, validation wrapper device 250 may send the second content data to content validation node 220 in the appropriate blockchain network (e.g., using an API that corresponds to the blockchain network, broadcasting the second content data to the blockchain network, and/or the like).

In this way, validation wrapper device 250 provides the second content data to a content validation node 220, enabling content validation node 220 to perform a content validation process on content associated with the second content data, and further enabling validation wrapper device 250 to obtain validation results.

As further shown in FIG. 5, process 500 may include obtaining content validation results associated with the content (block 540). For example, validation wrapper device 250 may obtain (e.g., using processor 320, input component 350, communication interface 370, and/or the like) content validation results associated with the content from content validation node 220.

In some implementations, validation wrapper device 250 obtains content validation results based on content validation node 220 providing the content validation results to validation wrapper device 250. For example, content validation node 220 may be configured (e.g., via a smart contract) to provide validation wrapper device 250 with the results of content validation when the validation process has been performed. In some implementations, validation wrapper device 250 obtains content validation results based on validation wrapper device 250 reading the validation results from the blockchain used by content validation node 220 for content validation. For example, validation wrapper device 250 may periodically check the blockchain network for a transaction associated with the content data, e.g., in a manner designed to enable validation wrapper device 250 to read and obtain validation results from the blockchain.

A variety of information may be included in the validation results obtained by validation wrapper device 250. For example, the validation results may include any of the information described above with reference to block 440. Examples include validation parameters, measures of confidence associated with validation parameters, scores associated with each validation parameter, a score associated with accuracy of the content, a determination or other indication regarding the accuracy of the content, and/or the like. Using the social media content example, validation wrapper device 250 may obtain validation results that indicate that the social media content is accurate, trustworthy, legitimate, and/or the like.

In this way, validation wrapper device 250 may obtain validation results associated with the content, enabling validation wrapper device 250 to perform an action based on the validation results.

As further shown in FIG. 5, process 500 may include performing an action based on the validation results (block 550). For example, validation wrapper device 250 may perform an action based on the validation results. In some implementations, validation wrapper device 250 may perform any of the operations described above (e.g., with reference to block 450) as being performed by content validation node 220. By way of example, validation wrapper device 250 may provide the content provider with data indicating the validation results, provide the content provider with data that causes display of a validation indicator with the content, provide data that causes content provider to automatically remove content determined to be invalid or inaccurate, and/or the like. By way of example, validation wrapper device 250 may provide content provider device 210 (e.g., associated with the content provider that provided the first content data) with data that causes display of a validation indicator in a web page element that is to be included in a web page associated with the content, such as a web page overlay, button, and/or the like. The web page element may display information designed to enable a user viewing the web page to determine whether the content included in the web page has been validated and is accurate.

In an implementation where validation wrapper device 250 is implemented in user device 230 (e.g., using an application operating on user device 230 to perform operations described as being performed by validation wrapper device 250), validation wrapper device 250 may cause display of a validation indicator on a display of validation wrapper device 250. By way of example, validation wrapper device 250 may include a smart phone that uses a web browsing application to view content, and a web browser extension application to obtain content validation results and display a visual indicator (e.g., overlay, button, watermark, highlighted text, and/or the like) in the web browser of the smart phone. Using the social media content example, a user may view the social media content on a social media application operating on the user's smart phone. Using a plugin or separate application, the smart phone may broadcast data identifying the social media content to a content validation blockchain network. After the smartphone (e.g., via the plugin or separate application) obtains the results of the validation (either previously performed validation or validation performed based on the receipt of the social media content), the smartphone (e.g., via the plugin or separate application), may display a visual indicator with the social media content, the visual indicator indicating the results of the validation process.

In some implementations, the action performed by validation wrapper device 250 may include validating the content based on the validation results. The validation performed by validation wrapper device 250 may include any validation operations described above (e.g., with reference to block 430) as being performed by content validation node 220. The validation performed by validation wrapper device 250 may be in addition to any validation process performed by content validation node 220. For example, validation wrapper device 250 may use the validation results (e.g., obtained at block 540) to validate the content. Using the social media post example, the validation results may include multiple validation parameter confidence values, and validation wrapper device 250 may use the validation parameter confidence values to validate the content as accurate (or inaccurate).

In some implementations, validation wrapper device 250 may perform an action that causes content to be removed, or to otherwise be made unavailable. For example, a content provider may use validation wrapper device 250 (and content validation node 220) to determine whether content published by the content provider is accurate and, in a situation where the content is determined to be inaccurate, the content may be automatically removed, flagged for removal, flagged for manual review, and/or the like.

In some implementations, validation wrapper device 250 may verify that the content has not changed based on verification data included in the validation results. For example, validation results may include hash data that was generated (e.g., by validation wrapper device 250 and/or content validation node 220) by hashing the content. Validation wrapper device 250 may verify that the content has not changed by hashing the content and comparing the results to the hash data included in the validation results. In a situation where the hash data matches, the content is unlikely to have changed after the validation process was performed. In a situation where the hash data does not match, the content was changed after the content validation process was performed and, as such, the validation results may be inaccurate and/or need to be performed again. In this situation, validation wrapper device may cause the content to be validated again (e.g., in response to determining that the content has changed).

In some implementations, validation wrapper device 250 may receive a request for validation data associated with content, and provide validation data based on receipt of the request. For example, user device 230 may interact with a web page element included in a web page associated with content that is provided by content provider device 210; the web page element may include a link to a website hosted by validation wrapper device 250. Based on user device 230 interaction with the web page element, user device 230 may provide validation wrapper device 250 with data identifying the content (e.g., the content displayed on the page with the web page element). In this situation, validation wrapper device 250 may obtain, from the blockchain, validation data regarding the validation of the content (e.g., validation parameters, confidence scores, and/or the like); validation wrapper device 250 may then cause display of the validation data on the website, in a manner designed to enable the user of user device 230 to view the validation data.

Using the social media content example, validation wrapper device 250 may have provided the social media content provider with a visual indicator that identified a particular social media post as inaccurate. The visual indicator may have also included a link to a website hosted by validation wrapper device 250. A user (e.g., wishing to obtain more information on why the social media post was validated as inaccurate), may use a user device to interact with the link, enabling the user to view the website provided by validation wrapper device 250. Interaction with the link may provide validation wrapper device 250 with data identifying the social media post, and may enable validation wrapper device 250 to obtain, from the blockchain, validation data that includes the information used by content validation nodes 220 to determine that the social media post was validated as inaccurate. After obtaining the validation data, validation wrapper device 250 may cause display of the validation data on the website, e.g., enabling the user to view the information used to determine that the social media post was inaccurate.

While a variety of example actions are described above, additional and/or different actions may be performed by validation wrapper device 250, e.g., in a manner designed to facilitate content validation using a blockchain. In this way, validation wrapper device 250 may perform an action based on the validation results, enabling content providers and users who view content provided by content providers to obtain an independent validation of content. The use of validation wrapper device 250 may facilitate simple interaction with the blockchain network that performs content validation, and may further facilitate the ability to both submit content for validation and obtain content validation results.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are diagrams of example content validated using a blockchain. The examples provide a variety of visual indicators that may be displayed with content that has be validated by a content validation process, such as process 400 and/or process 500 described above. While each of the examples is related to providing an indication of the accuracy of news articles, similar visual indicators may be used to provide an indication of the accuracy, trustworthiness, legitimacy, etc., of other types of content.

As shown in FIG. 6A, an example news article 600 is presented. The display of the example news article 600 may, for example, correspond to the manner in which a web browsing application of a user device 230 may present a digital news article to a user. The example news article 600 is displayed with two visual indicators regarding the accuracy of the content of the example news article which, in this example, was determined to be accurate. For example, a pattern is shown in the background of the example news article 600, which may represent a pattern or color (e.g., green) associated with content that has been determined to be accurate. The example news article 600 also includes text indicating that the news article has been "validated by content validator," and a link. The link may be to a web page or other content associated with the blockchain for the content (e.g., enabling a user to follow the link to view the validation results, validation information, and/or the like).

As shown in FIG. 6B, another example news article 620 is presented. The display of the example news article 620 may, for example, correspond to the manner in which a web browsing application of a user device 230 may present a digital news article to a user. The example news article 620 is displayed with two visual indicators regarding the accuracy of the content of the example news article which, in this example, was determined to be inaccurate. For example, a pattern is shown in the background of the example news article 620, which may represent a pattern or color (e.g., red) associated with content that has been determined to be inaccurate. The example news article 620 also includes text indicating that the news article "content may contain inaccuracies," and a link. The link may be to a web page or other content associated with the blockchain for the content (e.g., enabling a user to follow the link to view the validation results, validation information, and/or the like).

As shown in FIG. 6C, an example news article 640 is presented. The display of the example news article 640 may, for example, correspond to the manner in which a web browsing application of a user device 230 may present a digital news article to a user. The example news article 640 is displayed with multiple visual indicators regarding the accuracy of the content of the example news article which, in this example, separately highlighted text in a manner designed to indicate whether the highlighted portion of the content is accurate. For example, some text of the example news article 640 is shown with a highlight in a first pattern, while other text of the example news article 640 is shown with a highlight in a second pattern. The first pattern may represent a pattern or color (e.g., green) associated with the portions of the content that have been determined to be accurate, while the second pattern may represent a pattern or color (e.g., red) associated with the portions of the content that have been determined to be inaccurate. The example news article 600 also includes text indicating that the news article has been "validated by content validator," and a link. The link may be to a web page or other content associated with the blockchain for the content (e.g., enabling a user to follow the link to view the validation results, validation information, and/or the like).

As shown in FIG. 6D, an example web page 660 of a news aggregator is presented. The display of the example web page 660 may, for example, correspond to the manner in which a web browsing application of a user device 230 may present a web page to a user. The example web page 660 includes snippets, or portions, of three different news articles. In addition, each of the snippets, or portions of the three news articles, is displayed with a visual indicator that indicates whether the corresponding news article was validated. While not displayed with a separate indicator regarding the results of the validation process, in some implementations indicators could provide both an indication that the validation process has been performed for an article and the results of the validation process.

In the example web page 660, the first news article is displayed with a visual indicator indicating that the news article has been validated. The second news article is displayed with a visual indicator indicating that validation of the news article is in progress. The third news article is displayed with a visual indicator indicating that the news article has not been validated. In some circumstances, providing an indication regarding whether validation has been or will be performed may provide some additional assurance, or skepticism, to a user, regarding whether the content is reliable.

As indicated above, FIGS. 6A-6D are provided merely as examples. Other examples are possible and may differ from what was described with regard to FIGS. 6A-6D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of content validating using blockchain, the method comprising:
   generating, by a device and based on first content, a formatted second content that is in a format to facilitate content validation for the first content;
   providing, by the device and to a content validation node associated with the blockchain, the formatted second content;
   obtaining, by the device and based on providing the formatted second content, validation results that are based on an algorithm for validating the formatted second content,
      wherein the obtained validation results comprise an evaluation score associated with an indication of accuracy related to the first content;
   performing, by the device and based on the indication, an action,
      wherein the action includes providing data that causes the indication to be embedded in third content that is modified from the first content; and
   storing, by the device, the validation results in the blockchain as a transaction record.

2. The method of claim 1, wherein the validation results are associated with accuracy or trustworthiness associated with the first content, and
   wherein the indication comprises at least one of:
      highlighted text,
      a visual indication of the validation results,
      modification of background of the first content,
      portions of the first content, or
      a link to information associated with the blockchain for the first content.

3. The method of claim 1, wherein the first content includes incentive information specifying compensation available for performing validation of the first content.

4. The method of claim 1, wherein the first content is associated with a content provider; and
   the method further comprising:
      identifying, based on the content provider or based on the first content, the blockchain.

5. The method of claim 1, wherein the blockchain contains validation information that includes the algorithm.

6. The method of claim 1, wherein the blockchain is a permissioned blockchain associated with a blockchain network, and
   wherein the device is included in the blockchain network.

7. The method of claim 1, further comprising:
   providing, to a plurality of other devices associated with the blockchain, a notification indicating the validation results.

8. A device for content validating using blockchain, comprising:
   one or more memories; and
   one or more hardware processors, coupled to the one or more memories, configured to:

generate, based on first content, a formatted second content that is in a format to facilitate content validation for the first content;

provide, to a content validation node associated with a blockchain, the formatted second content;

obtain validation results that are based on an algorithm for validating the formatted second content,
   wherein the obtained validation results comprise an evaluation score associated with an indication of accuracy related to the first content;

perform, based on the indication, an action that includes providing data that causes the indication to be embedded in modified content of the first content; and storing the validation results in the blockchain as a transaction record.

9. The device of claim 8, wherein the validation results are associated with accuracy or trustworthiness associated with the first content, and
   wherein the indication comprises at least one of:
      highlighted text,
      a visual indication of the validation results,
      modification of background of the first content,
      portions of the first content, or
      a link to information associated with the blockchain for the first content.

10. The device of claim 8, wherein the first content includes incentive information specifying compensation available for performing validation of the first content.

11. The device of claim 8, wherein the first content is associated with a content provider, and
   wherein the one or more processors are further configured to:
      identify, based on the content provider or based on the first content, the blockchain.

12. The device of claim 8, wherein the blockchain contains validation information that includes the algorithm.

13. The device of claim 8, wherein the blockchain is a permissioned blockchain associated with a blockchain network, and
   wherein the device is included in the blockchain network.

14. The device of claim 8, wherein the one or more processors are further configured to:
   provide, to a plurality of other devices associated with the blockchain, a notification indicating the validation results.

15. A non-transitory computer-readable medium storing a set of instructions for content validating using blockchain, the set of instructions comprising:
   one or more instructions that, when executed by one or more hardware processors of a device, cause the device to:
      generate, based on first content, a formatted second content that is in a format to facilitate content validation for the first content;
      provide, to a content validation node associated with a blockchain, the formatted second content;
      obtain validation results that are based on an algorithm for validating the formatted second content,
         wherein the validation results comprise an evaluation score associated with an indication of accuracy related to the first content;
      perform, based on the indication, an action,
         wherein the action includes providing data that causes the indication to be embedded in modified content of the first content; and
      store the validation results in the blockchain as a transaction record.

16. The non-transitory computer-readable medium of claim 15, wherein the validation results are associated with accuracy or trustworthiness associated with the first content, and
   wherein the indication comprises at least one of:
      highlighted text,
      a visual indication of the validation results,
      modification of background of the first content,
      portions of the first content, or
      a link to information associated with the blockchain for the first content.

17. The non-transitory computer-readable medium of claim 15, wherein the first content includes incentive information specifying compensation available for performing validation of the first content.

18. The non-transitory computer-readable medium of claim 15, wherein the first content is associated with a content provider, and
   wherein the one or more instructions, when executed by the one or more processors, further cause the device to:
      identify, based on the content provider or based on the first content, the blockchain.

19. The non-transitory computer-readable medium of claim 15, wherein the blockchain contains validation information that includes the algorithm.

20. The non-transitory computer-readable medium of claim 15, wherein the blockchain is a permissioned blockchain associated with a blockchain network, and
   wherein the device is included in the blockchain network.

* * * * *